July 28, 1936.  C. J. DUNZWEILER ET AL  2,049,201
INVERTIBLE STORAGE BATTERY
Filed Feb. 23, 1935   2 Sheets-Sheet 1

INVENTORS
CARL J. DUNZWEILER
ROBERT M. RANEY
BY
Kwis Hudson & Kent
ATTORNEYS

July 28, 1936.  C. J. DUNZWEILER ET AL  2,049,201
INVERTIBLE STORAGE BATTERY
Filed Feb. 23, 1935  2 Sheets-Sheet 2

INVENTORS.
CARL J. DUNZWEILER
BY ROBERT M. RANEY
Kuis Hudson & Kent
ATTORNEYS.

Patented July 28, 1936

2,049,201

UNITED STATES PATENT OFFICE 2,049,201

INVERTIBLE STORAGE BATTERY

Carl J. Dunzweiler, Cleveland, and Robert M. Raney, Euclid, Ohio, assignors to Willard Storage Battery Company, Cleveland, Ohio, a corporation of West Virginia Application February 23, 1935, Serial No. 7,678

10 Claims. (Cl. 136—170)

This invention relates to storage batteries and, more particularly, to an improved construction for storage batteries of the type intended especially for airplane use, that is, of the type having a lower compartment containing battery plates and electrolyte and an upper compartment into which the electrolyte flows when the battery is inverted.

An object of the present invention is to provide an improved construction for an invertible or airplane type of storage battery, wherein the design and arrangement of the parts are such as to increase the available acid space and thus permit a decrease in the over all dimensions of the battery.

Another object of the invention is to provide an improved invertible or airplane type of battery having outer and inner covers and wherein novel means is provided for spacing the covers.

A further object of this invention is to provide an improved battery, of the type mentioned, wherein one of the covers has spaced integral projections extending toward and engaging the other cover.

It is also an object of this invention to provide an improved battery, of the type mentioned, having a lower compartment containing battery plates and electrolyte and an upper electrolyte-receiving compartment provided with a cover, and wherein skeleton-like spacing means between the plates and the cover is adapted to also form a cover for the lower compartment.

The invention may be further briefly summarized as consisting in certain novel combinations and arrangement of parts hereinafter described and more particularly set out in the appended claims.

In the accompanying drawings.

In the accompanying drawings to which detailed reference will now be made, we have illustrated an improved storage battery of the invertible or airplane type, wherein the construction and arrangement of the parts is such as to increase the available acid space to the extent that the over all dimensions of the battery may be reduced. It will be understood, of course, that the drawings should be regarded as illustrative only and that the invention may be embodied in storage batteries of various sizes and shapes.

Figure 2:
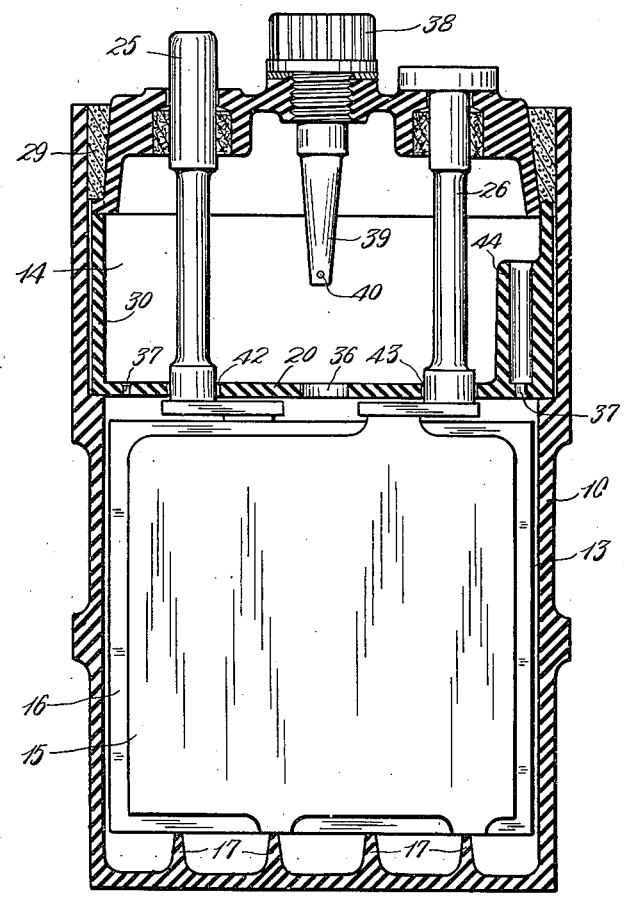
Fig. 2 is a transverse sectional view taken on an irregular section line as indicated by 2—2 of Fig. 1.

The storage battery shown in this instance is provided with a container 10 which may be of any appropriate material and may be of any suitable size, shape or form. In this instance the container has partition walls 11 and 12 dividing the interior thereof into three cells although the invention may be embodied in a battery having any desired number of cells. The container 10 is also formed to provide a lower compartment 13 and an upper compartment 14 for each cell. The lower compartment, as shown in Fig. 2 of the drawings, contains the usual battery plates and separators 15 and 16, and also contains a suitable electrolyte. The bottom of the lower compartment may be provided with the usual upstanding ridges 17 which form rests for the plates and separators.

The outer walls of the container and the partition walls 11 and 12 thereof are provided with shoulders 19 at a substantial distance below the top of the container. These shoulders are located just above the tops of the battery plates and separators or, in other words, at the junction of the lower and upper compartments of the cells. These shoulders provide a support for the diaphragm or inner cover 20 which separates the lower and upper compartments.

Figure 1:
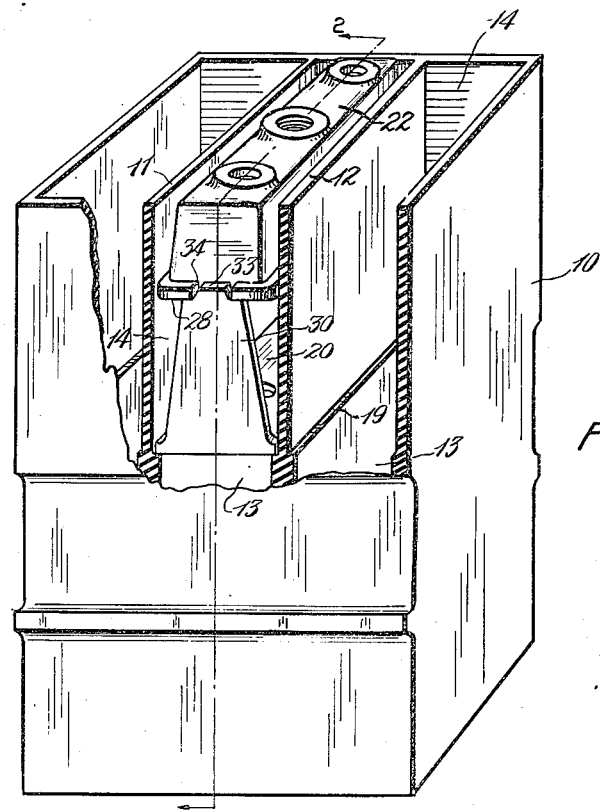
Fig. 1 is a perspective view with parts broken away showing a storage battery container having parts arranged therein according to our invention.
Figure 3:
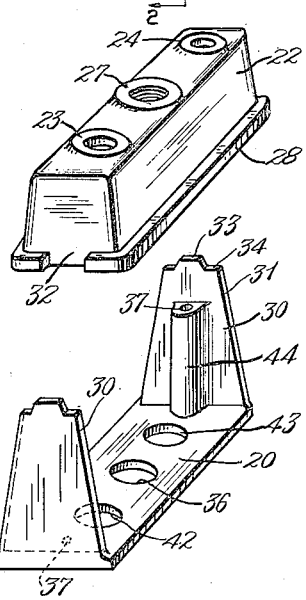
Fig. 3 is a perspective view showing the outer cover in detached relation.

An outer cover 22 is provided for each of the battery cells and forms a closure for the upper compartment 14. This cover is the usual upwardly dished cell cover which fits into the cell opening at the top of the battery container. As shown in the drawings the cover may have the usual openings 23 and 24 for the battery posts or terminals 25 and 26, and may have the usual vent and filling opening 27. The cover also has the usual laterally extending marginal flange 28 around the lower edge thereof. The cover as shown in Figs. 1 and 2 fits into the upper part of the cell opening and may be suitably sealed therein by appropriate sealing compound 29 located in the groove or space between the cover and the cell walls above the lateral flange 28.

Figure 4:
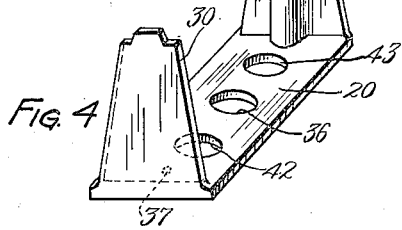
Fig. 4 is a perspective view showing the inner cover or diaphragm.

For spacing and supporting the outer cover 22 at the desired height above the battery plates and inner cover 20 so as to form the upper compartment 14 into which the electrolyte may run when the battery is inverted, we provide spacing means which, in accordance with our invention, extends at spaced points between the outer cover and the inner cover or diaphragm. This spacing means may comprise posts or extensions 30 formed integral with the inner cover 20, preferably adjacent the ends thereof, and which extend upwardly along the sides of the container and engage and support the outer cover 22. The extensions 30 may be located at the extreme edge or margin of the inner cover 20 so that they will lie close to opposite side walls of the container. There may be two or more of these extensions and they may be of any suitable shape or form. In Fig. 4 we show the extensions 30 as being located at the ends of the inner cover 20 and as being relatively thin flat posts of tapering width. The integral extensions 30 are of such length that when the inner cover 20 is supported upon the shoulders 19 of the walls of the container, the outer cover 22 will be supported at the desired elevation by the extensions.

It may be desirable to provide interengagement between the outer cover 22 and the supporting extensions or posts 30 of the inner cover. Such interengagement may be desirable for the purpose of reducing or eliminating the tendency for the outer cover to tilt or rock in the cell opening, particularly when the extensions of the inner cover are of reduced width or engage only two sides or ends of the outer cover. Such interengagement may be provided in various ways, for example, the flange 28 of the outer cover may be formed with recesses 32 and the tops of the extensions 30 may be provided with lugs 33 which engage in such recesses. Adjacent the lugs 33 the tops of the extensions 30 have shoulders 34 which engage the under side of the flange 28 adjacent the edges of the recesses 32. When the parts are in assembled relation, as shown in Figs. 1 and 2, the lugs 33 extend into and substantially fill the recesses 32 and prevent the sealing material 29 from passing downwardly through the recesses.

As already stated, the present battery is of the airplane or invertible type and has an upper chamber 14 into which the electrolyte may run when the battery is inverted. To permit such transfer of electrolyte into the compartment 14 we provide the inner cover 20 with a substantially central opening 36 for the passage of liquid and one or more vent openings 37 adjacent the ends of the cover. The battery also has a vent and closure plug 38 in the opening 27 of the outer cover. As is usual in batteries of this particular type, the plug 38 has an extension 39 thereon with a vent opening 40 adjacent its inner end. The plug extension 39 is of such length that the end thereof containing the vent opening 40 will always be above the level of the electrolyte so as to permit the escape of gases from the battery even when it is in inverted position. The inner cover 20 also has openings 42 and 43 therein which accommodate the terminal posts 25 and 26 extending upwardly from the battery plates 15.

To facilitate the flow of electrolyte into and out of the lower compartment of the cell, it may be desirable to have one or both of the vent passages 37 of a length to extend for some distance above the cover 20 so that the air which is displaced from the lower compartment as the electrolyte returns thereinto through the passage 36, will not need to bubble up through the electrolyte. Such elongation of the vent passage 37 may be provided by forming the vent passage in one of the integral extensions 30 of the inner cover. To accommodate such elongated vent passage one or both of the extensions 30 may be provided with an increased body of material forming a rib or enlargement 44 in which such vent passage may be formed as shown in Figs. 2 and 4.

Figure 5:
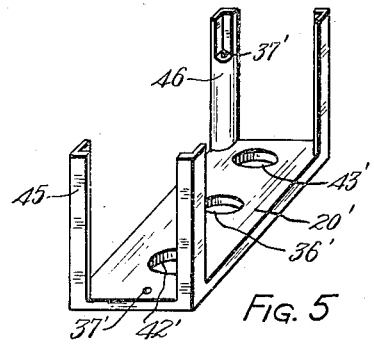
Fig. 5 is a perspective view showing another construction for the inner cover.

The spacing means extending between the inner and outer covers 20 and 22 may be of other form than that already described and, for example, may comprise integral posts 45 extending upwardly at the corners of a cover or diaphragm 20' as shown in Fig. 5 of the drawings. Such posts are of a length to engage and support the outer cover in the proper position when the inner cover 20' engages the shoulder 19 of the cell walls. The posts 45 may be of angular cross-section so as to fit into the corners formed by the container walls.

The cover 20' may have openings 42' and 43' for the terminal posts of the battery, and may also have a central opening 36' for the passage of electrolyte when the battery is inverted or reversed. The cover 20' may also have one or more vent openings 37' adjacent the ends thereof and, if desired, one or both of these vent openings may be elongated by forming the same in an increased body of material 46 provided in the recess of one of the angular posts 45.

Figures 6, 7, 8:
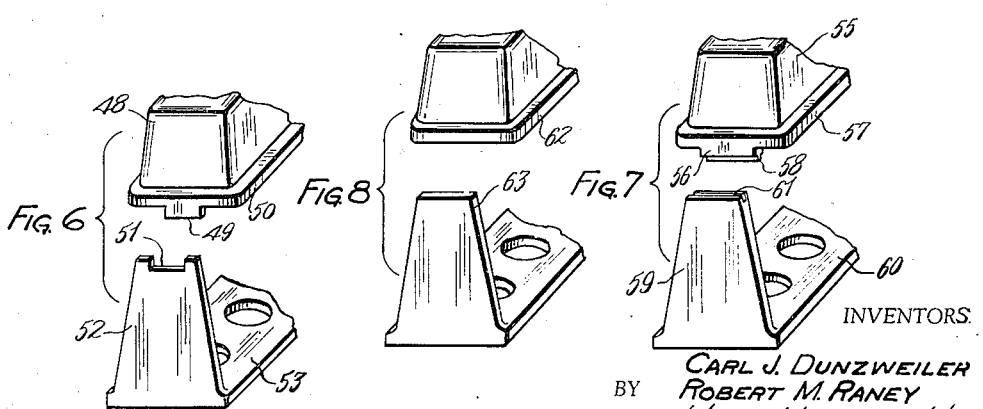
Figs. 6, 7, and 8 are partial perspective views showing other constructions for the outer cover and spacing means.

As stated above, interengagement between the outer cover and the spacing means may be provided in different ways, and, for example, in Figs. 6 and 7 we show other means for accomplishing this result. In Fig. 6 the outer cover 48 is provided with lugs 49 at its ends which depend from the marginal flange 50 for engagement in recesses 51 formed in the tops of the spacing extensions 52 of the inner cover 53. In Fig. 7 the outer cover 55 has lugs 56 which depend from the marginal flange 57 and are provided with tongues 58 and the tops of the spacing extensions 59 of the inner cover 60 have grooves 61 into which the tongues 58 extend when the lugs 56 engage the tops of the extensions.

Should it be desirable to eliminate the feature of interengagement between the outer cover and the spacing means to reduce the cost of producing these parts, or for any other reason, the flange 62 of the outer cover and the tops of the extensions 63 of the inner cover may be left plain or flat, as shown in Fig. 8.

It will be understood that the diaphragm or inner cover and the cover spacing and supporting means may be formed in any suitable way, such as by molding, and that they may be formed of any suitable material, such as hard rubber or other appropriate substance.

From the construction and arrangement of the parts as illustrated and described, it will be readily seen that the spacing means which extends between the covers occupies but very little room in the upper compartment of the cell and hence increases the electrolyte space of this compartment as compared with the electrolyte space available in similar batteries which heretofore have been provided with spacing means extending along the full perimeter of the cell. Furthermore, the spacing means which we have provided is of very simple construction since it is of skeleton-like form and when made integral with the inner cover or diaphragm can be economically manufactured without an increase in the number of parts required to be assembled into the cell. It will be understood, furthermore, that by reason of the increased electrolyte space made available by the use of our skeleton-like form of spacing means, the overall dimensions of the battery can be reduced, and this is a very important factor in the design of airplane batteries.

While we have illustrated and described the improved battery of our invention in a somewhat detailed manner, it will be understood, of course, that we do not wish to be limited to the precise details of construction and arrangements of parts illustrated and described, but regard the invention as including such changes and modifications as do not involve a departure from the spirit of the invention and the scope of the appended claims.

Having thus described our invention, we claim:

1. A storage battery comprising a container having a lower chamber containing battery plates and an electrolyte, and an upper chamber, said upper chamber comprising a cover and a diaphragm one of which has spaced integral projections extending toward and engaging the other.

2. A storage battery comprising a container having a lower chamber containing battery plates and an electrolyte, and an upper chamber, said upper chamber comprising a cover and a diaphragm having spaced integral marginal projections extending upwardly therefrom to the cover.

3. A storage battery comprising a container having a lower chamber containing battery plates and an electrolyte, and an upper chamber, said upper chamber comprising a cover and a diaphragm having spaced integral marginal projections extending upwardly therefrom to the cover, one of said projections having a vent passage therein.

4. In a storage battery, a container having a lower compartment with battery plates and electrolyte therein and an upper compartment, a cover for the upper compartment, a cover for the lower compartment, and skeleton-like spacing means between said covers.

5. A storage battery comprising a container having lower and upper compartments, a cover for the upper compartment, and a cover for the lower compartment, one of said covers having integral posts at its ends extending along the walls of the container and engaging the other cover.

6. A storage battery comprising a container having lower and upper compartments, a cover for the upper compartment, and a cover for the lower compartment, the latter cover having integral posts at its corners extending upwardly to the upper cover.

7. A storage battery comprising a container having lower and upper compartments, a cover for the upper compartment, and a cover for the lower compartment, the latter cover having integral posts of angular cross section at its corners extending upwardly in the corners of the container to the upper cover.

8. A storage battery comprising a container having lower and upper compartments, a cover for the upper compartment, and a cover for the lower compartment, the latter cover having integral posts at its corners extending upwardly to the upper cover, one of said posts having a vent passage therein.

9. A storage battery container having a lower compartment adapted to contain battery plates and an electrolyte, and an upper compartment, a cover for each compartment, one of the covers having spaced integral projections extending to the other cover, and means providing interengagement between said projections and said other cover.

10. A storage battery container having a lower compartment adapted to contain battery plates and an electrolyte and an upper compartment, a cover for the upper compartment having recesses in the edge thereof, and a cover for the lower compartment having integral projections extending upwardly to support the upper cover with portions of said projections engaging in said recesses.

CARL J. DUNZWEILER.
ROBERT M. RANEY.